Feb. 2, 1932.  C. P. DUBBS  1,843,709
PROCESS FOR CONVERTING OIL
Original Filed June 22, 1921
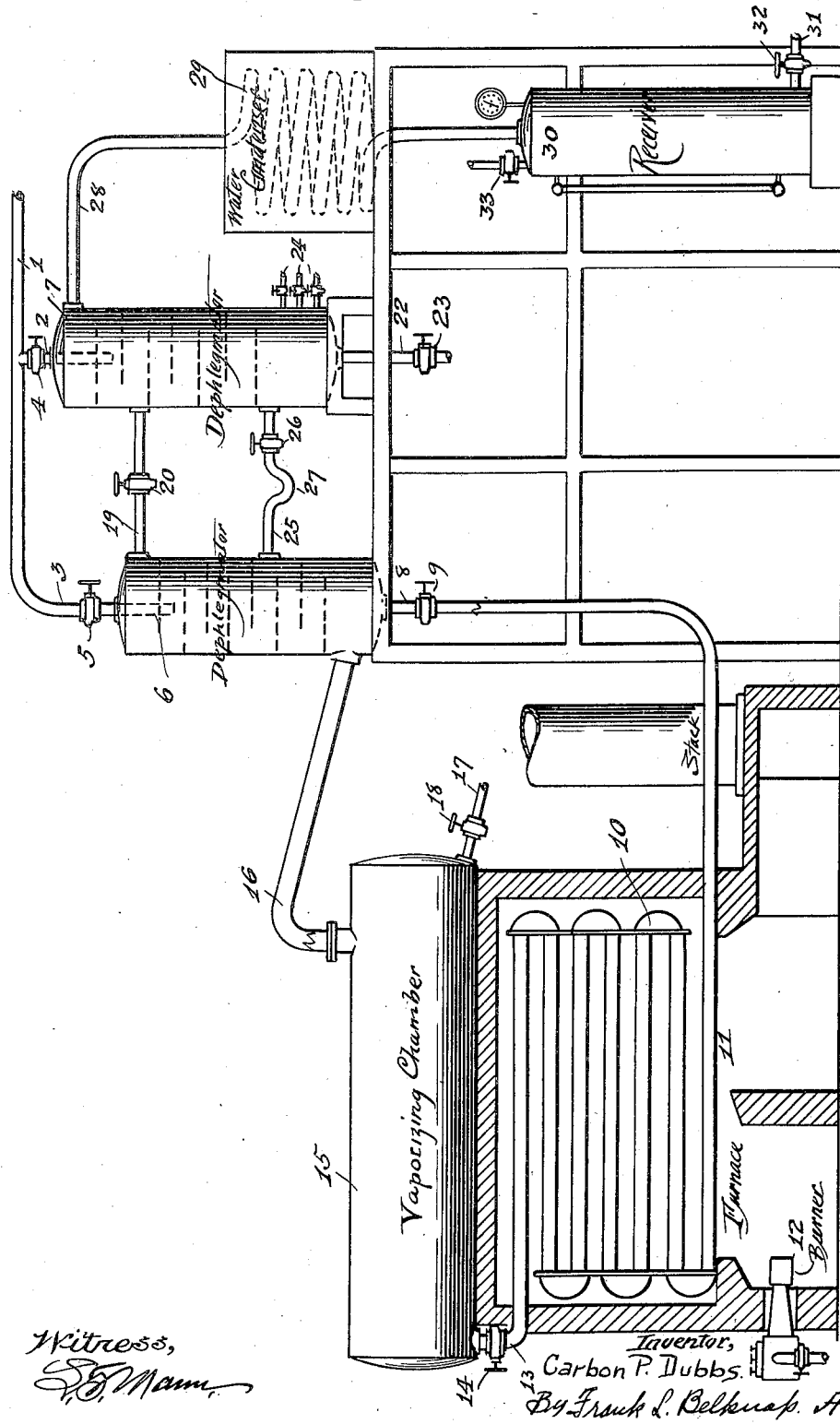

Patented Feb. 2, 1932

1,843,709

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS FOR CONVERTING OIL

Application filed June 22, 1921, Serial No. 479,446. Renewed September 23, 1925.

This invention relates to a process for converting oil and refers more particularly to an improved process for relieving the oil of water vapor and water which may be condensed out during distillation.

Among the salient objects of the invention are to provide a process in which the oil body is separated into a vaporized and unvaporized portion in the vapor chamber, the vaporized portion passing to a refluxing stage and thence condensed to pressure distillate while the unvaporized portion is drawn off and conducted to storage or subjected to further treatment; to provide a process in which the vapors directed to the dephlegmating stage undergo the refluxing action of the incoming raw oil at such a temperature that only the higher boiling point fractions are relieved therefrom; to provide a process in which the temperature in the primary stage of dephlegmation is so controlled that it is normally maintained above the temperature of water condensation at the pressure used, preventing the separation of any water contained in the oil with the reflux condensate therein; to provide a process in which is interposed a separate refluxing stage between the primary stage and the stage of condensation in which a temperature is maintained that will separate out any water or moisture in the oil; to provide a process whereby difficulties encountered due to returning water to the heating zone are obviated due to the removal of the water and water vapor in a separate refluxing or zone of condensation; to provide an apparatus for carrying out this process.

The single figure is a diagrammatic side elevation of the apparatus.

Referring to the drawing—the raw oil is introduced from any convenient source through the inlet pipe 1 which has secondary connections 2 and 3 controlled by valves 4 and 5 respectively whereby the raw oil may be introduced to either or both of the separating or dephlegmating columns 6 and 7. In either case the raw oil serves as a refluxing medium and separates out the higher boiling point fractions from the oil vapors rising in the column. The raw oil introduced into the dephlegmator 6 is drawn off with what condensate it may collect therein through the line 8 regulated by a valve 9 and is directed to the heating tubes 10 mounted in a furnace 11 preferably heated by means of gas burners 12. The oil, after being heated to a cracking temperature in the heating zone passes through the transfer line 13 controlled by a valve 14 to the vaporizing chamber 15 where the vaporized portion rises through the vapor line 16 and is directed to the bottom of the dephlegmating column 6 where, as previously explained, it is refluxed by the incoming raw oil. The unvaporized portion, on the other hand, which comprises a substantial part of the residual products of the cracking reaction are drawn off through the line 17 regulated by a valve 18 and conducted to storage or cooling tanks as desired. After being refluxed in the dephlegmating column 6 the vapors pass over through the line 19 in which is interposed a valve 20 to the second refluxing column 7 where the vapors again undergo the refluxing action of the incoming raw oil through the line 2. It will be noted that the inflow of the cool raw oil to each of the dephlegmators is so regulated that the temperatures in the respective columns are accurately controlled.

In operating the process it is desirable to maintain the temperature at the top of the first dephlegmating column above the condensing temperature of water so that there will be no water condensation in the first refluxing stage. This is essential due to the fact that water contained in the reflux condensate returned to the heating tube is an exteremely dangerous factor due to the high temperature in the heating zone. Also this comparatively high temperature maintained in the primary refluxing stage relieves the oil of a substantial part of only the higher boiling point fractions and the interposition of a double dephlegmating stage, as shown, besides having the advantages of the double refluxing also relieves the oil of a greater percentage of the lighter cuts.

While the temperature at the top of the first refluxing stage is above that at which water will condense the temperature at the top of the second stage is maintained below the temperature of water condensation and, therefore, substantially all of the water will be separated out in the second refluxing column. This water will collect in the bottom of the column and may be drawn off from time to time through the line 22 controlled by a valve 23. The oil and water level in the dephlegmating column 7 may be ascertained at all times by means of try-cocks 24. The oil in the refluxing column will rise above the water and will flow back into the dephlegmator 6 through the line 25 in which is interposed a valve 26. A trap 27 is formed in this line to prevent the passage of the vapors from the dephlegmator 6 therethrough. The vapors, after being refluxed in the primary refluxing stage and subjected to a second dephlegmating action in the secondary stage in the column 7 where any water contained in the oil is separated out, will pass over through the line 28 to a water condenser 29 and are collected as distillate in the receiver 30. The receiver is equipped with a liquid draw-off line 31 controlled by a valve 32 and a pressure relief valve 33 by means of which pressure on the system may be accurately regulated.

It is a fact that in practically all hydrocarbon oils there is percentage of water either in a free or emulsified stage which is a double factor where any condensate separated in a refluxing zone is to be returned to the zone of high temperature. Immediately on being returned, this water flashes into steam and presents difficulties both to the operation of the process besides the danger which accompanies its presence. Where it can be isolated in a separate refluxing zone, it may be effectively eliminated from the system and nothing but the clear oil condensate returned.

The addition of a second refluxing stage rather than hindering the operation and reducing the quantity and quality of the yield of distillate improves materially the character of the vapors which pass over for condensation and greatly facilitates the operation of the process due to the elimination of the water and water vapor.

I claim as my invention:—

1. A process of cracking emulsified hydrocarbon oils, consisting in continuously passing oil through a coil located in a furnace wherein the oil is raised to a conversion temperature, in discharging the oil from said coil into an enlarged reacting zone wherein substantial vaporization occurs, in passing the evolved vapors to a primary dephlegmator wherein they come in physical contact with incoming raw oil introduced into said dephlegmator to act as a dephlegmating medium, in maintaining a temperature in said primary dephlegmator above the condensation point of water, in returning the reflux condensate together with the raw oil from said dephlegmator to said heating coil, in passing the uncondensed vapors from said primary dephlegmator to a secondary dephlegmator wherein they come in physical contact with raw oil introduced into said secondary dephlegmator, in maintaining a temperature in said secondary dephlegmator below the condensation point of water to permit the water vapors to condense therein, in withdrawing water from the bottom of said secondary dephlegmator, in passing the reflux condensate formed in said secondary dephlegmator together with the raw oil introduced thereto from said secondary dephlegmator to said primary dephlegmator, in passing the uncondensed vapors from said secondary dephlegmator to a final condenser, and in collecting the resulting distillate.

2. A process for cracking emulsified hydrocarbon oil, consisting in continuously passing a stream of oil through a heating zone wherein it is subjected to a conversion temperature, in discharging the oil from said stream into an enlarged reacting chamber wherein substantial vaporization occurs, in continuously withdrawing residual carbon containing oil from said reacting chamber to be isolated from the system, in passing the evolved vapors from said reacting chambers to a primary zone of dephlegmation, in employing raw oil as a dephlegmating medium for the vapors in said primary zone of dephlegmation, in maintaining a temperature in said primary zone above the condensation point of water, in passing the uncondensed vapors from said primary zone to a secondary zone of dephlegmation wherein raw oil is employed as a dephlegmating medium, in maintaining a temperature in said secondary dephlegmating zone sufficiently low to permit the condensation of the water vapors therein, in returning the reflux condensate formed in said secondary zone together with the raw oil introduced thereto to said primary zone, in passing the uncondensed vapors from said secondary zone to a final condenser, in collecting the resulting distillate, in returning the reflux condensate together with raw oil free from water from said primary zone of dephlegmation to said coil, and in maintaining a self-generated vapor pressure on the oil undergoing conversion.

CARBON P. DUBBS.